US 6,534,147 B2

(12) United States Patent
Gopalan

(10) Patent No.: US 6,534,147 B2
(45) Date of Patent: Mar. 18, 2003

(54) COMPOSITE WEATHERSTRIP HAVING A FRICTION REDUCING SURFACE COATING ON A HARD BEARING LAYER

(75) Inventor: Krishnamachari Gopalan, Knoxville, TN (US)

(73) Assignee: Schlegal Corporation, New York, NY (US)

( * ) Notice: Subject to any disclaimer, the term of this patent is extended or adjusted under 35 U.S.C. 154(b) by 0 days.

(21) Appl. No.: 09/784,507

(22) Filed: Feb. 15, 2001

(65) Prior Publication Data
US 2002/0110663 A1 Aug. 15, 2002

(51) Int. Cl.$^7$ ................................ B32B 3/26
(52) U.S. Cl. ............... 428/122; 428/143; 428/217; 99/475.1; 99/490.1
(58) Field of Search .................... 428/122, 143, 428/217; 49/475.1, 490.1, 498.1

(56) References Cited

U.S. PATENT DOCUMENTS

| 3,685,206 A | 8/1972 | Kessler |
| 4,130,213 A | 12/1978 | Wszolek |
| 4,442,156 A | * 4/1984 | Yamaguchi ............... 428/142 |
| 4,448,835 A | * 5/1984 | Yamaguchi ............... 428/147 |
| 4,580,794 A | 4/1986 | Gibbons |
| 4,720,518 A | 1/1988 | Chihara et al. |
| 4,817,963 A | 4/1989 | Munden et al. |
| 4,860,495 A | 8/1989 | Kessler |
| 4,913,976 A | 4/1990 | Brooks et al. |
| 4,969,293 A | 11/1990 | Guillon |
| 4,970,102 A | 11/1990 | Guillon |
| 5,183,613 A | * 2/1993 | Edwards ................... 425/462 |
| 5,343,655 A | 9/1994 | Miyakawa et al. |
| 5,377,449 A | 1/1995 | Hineribara et al. |
| 5,447,671 A | 9/1995 | Kato et al. |
| 5,463,831 A | 11/1995 | Shinagawa et al. |
| 5,472,782 A | 12/1995 | Naritomi |
| 5,538,777 A | 7/1996 | Pauley et al. |
| 5,558,741 A | 9/1996 | Balcerski et al. |
| 5,575,485 A | 11/1996 | Merla et al. |
| 5,674,951 A | 10/1997 | Hargis et al. |
| 5,817,414 A | * 10/1998 | Ando ..................... 428/122 |
| 5,969,022 A | 10/1999 | Bova et al. |
| 6,298,908 B1 | * 10/2001 | Harrell et al. ............. 156/69 |
| 6,368,700 B1 | * 4/2002 | Venkataswamy et al. .. 49/475.1 |

FOREIGN PATENT DOCUMENTS

| EP | 0 021 989 A2 | 1/1981 |
| EP | 0 021 989 B1 | 1/1981 |
| GB | 2 355 480 | 4/2001 |
| WO | WO 00/03884 | 1/2000 |

* cited by examiner

Primary Examiner—Alexander S. Thomas
(74) Attorney, Agent, or Firm—Brian B. Shaw, Esq.; Stephen B. Salai, Esq.; Harter, Secrest & Emery LLP

(57) ABSTRACT

A weatherstrip having a hard bearing layer with a surface coating for reducing sliding friction between the weatherstrip and a panel is disclosed. A body of the weatherstrip has a relatively low durometer and the bearing layer has a greater durometer, wherein an exposed surface of the bearing layer is covered with a coating, wherein the coating can include a multitude of particles.

40 Claims, 2 Drawing Sheets

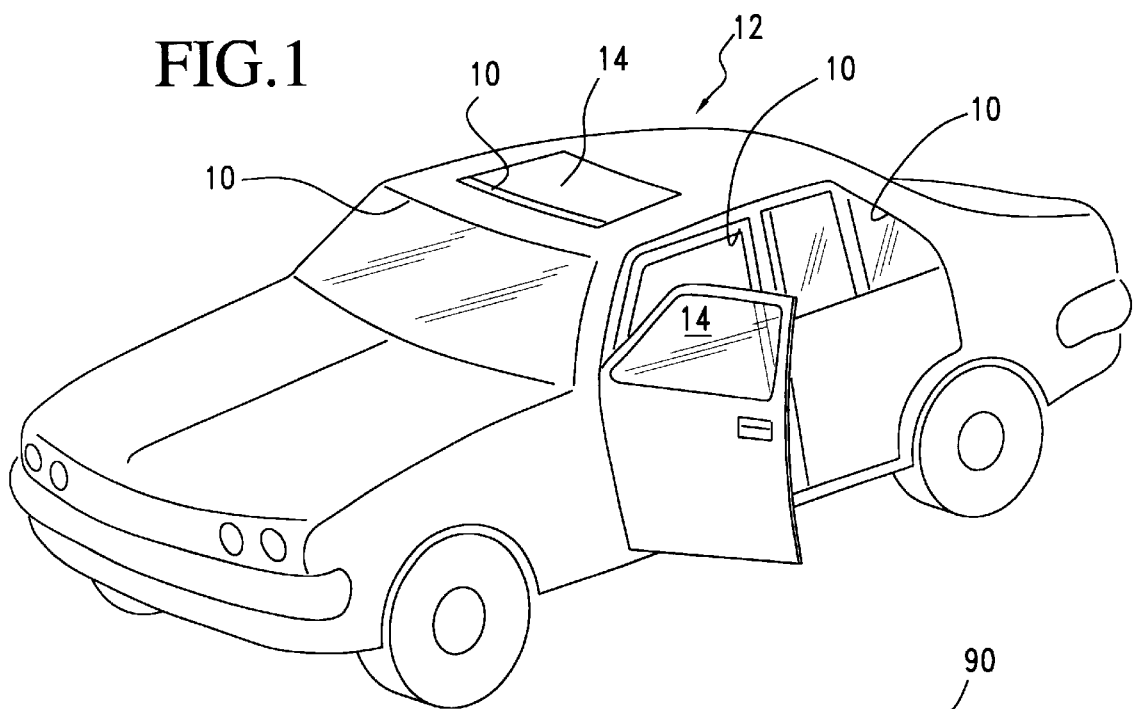
FIG.1
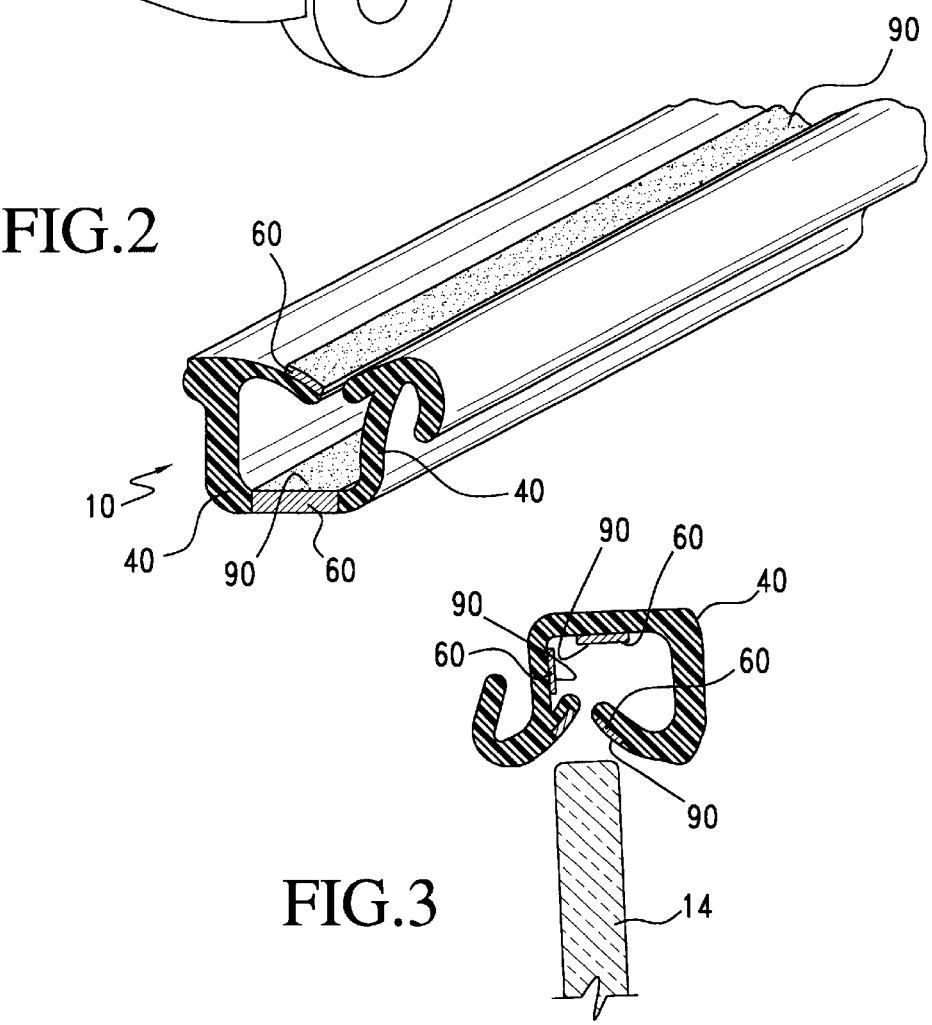
FIG.2
FIG.3

COMPOSITE WEATHERSTRIP HAVING A FRICTION REDUCING SURFACE COATING ON A HARD BEARING LAYER

FIELD OF THE INVENTION

The present invention relates to a composite strip for contacting a panel, and more particularly, to a weatherstrip having an elastomeric body, a hard bearing layer, and a friction reducing surface coating on the bearing layer, wherein the coating can include particles.

BACKGROUND OF THE INVENTION

Many vehicles employ windows formed of glass panels, wherein the window may be fixed or moveable relative to a portion of the vehicle. A common construction includes the use of a glass panel in a door, wherein the door and the glass panel move relative to the remainder of the vehicle, and the glass panel moves relative to the door. In this construction, the glass panel is frequently moved between an open position and closed position with respect to the door and/or a portion of the vehicle frame. Increased business transactions such as restaurant, banking and pharmacy services are now regularly offered in a drive-through format. These transactions require the repeated release and engagement of the glass panel and the vehicle. The repeated opening and closing of the glass panel places significant stress on the seal between the glass panel and the vehicle.

Weatherseals are also employed at the interface of a fixed panel such as a front or rear window, and the adjacent portion of the vehicle body.

Traditionally, a weatherseal is employed at the interface between the glass panel and the vehicle door and/or the vehicle. The interface between the weatherseal and the glass panel must be sufficient to substantially preclude the penetration of water, air borne particles and air along the periphery of the glass panel, while still permitting ready engagement and disengagement of the glass panel without requiring excessive force.

Therefore, the need exists for a weatherstrip which provides reduced friction when engaging and disengaging a panel. The need also exists for a weatherstrip that can guide the travel of a panel relative to the weatherstrip, while maintaining a reduced sliding friction. The need further exists for a weatherstrip that can satisfy sliding force cycle tests without requiring relatively expensive materials.

SUMMARY OF THE INVENTION

The present invention provides a composite strip for engaging a panel, wherein the composite strip reduces friction upon relative motion between the strip and the panel. The present invention provides a composite strip for releasable or permanent engagement with a panel.

In a first configuration, the present composite strip includes an elastomeric body having a hard bearing layer located in areas of contact with the panel, wherein the bearing layer includes a surface coating for reducing friction. One configuration of the surface coating can include particles or particulates. The bearing layer and the surface coating are selected to reduce sliding force upon movement of the panel relative to the composite strip. The particulated surface coating forms an irregular textured surface for engaging the panel. One configuration of the invention encompasses a composite strip having a relatively soft elastomeric body, such as 70 Shore A, a hard bearing layer, having a hardness greater than approximately 40 Shore D and a surface coating on the bearing layer, wherein the coating can optionally include particles. In a further configuration, the bearing layer has a hardness between approximately 60 to 65 Shore D.

BRIEF DESCRIPTION OF THE DRAWINGS

FIG. 1 is a perspective view of a vehicle employing a number of seals.

FIG. 2 is a perspective view of a weatherstrip incorporating the present invention.

FIG. 3 is a cross sectional view showing a relationship between a panel and a weatherstrip.

DETAILED DESCRIPTION OF THE PREFERRED EMBODIMENTS

Figure 4:
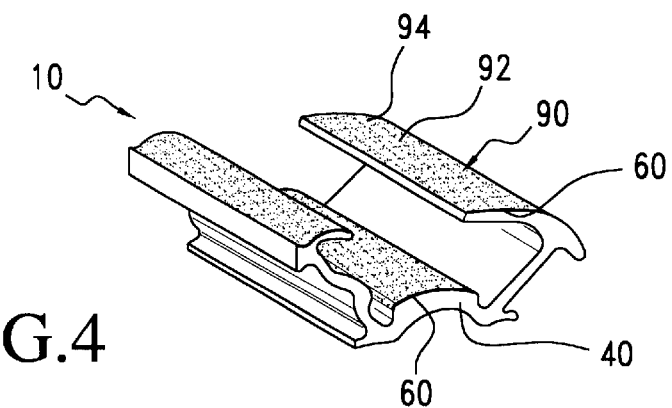
FIG. 4 is a perspective view of a further configuration of the weatherstrip.

The composite strip 10 of the present invention can be employed in a motor vehicle 12 as shown in FIG. 1. The composite strip 10 can be used in locations as a weatherstrip for releasably and repeatedly engaging a panel 14. For purposes of description, the present composite strip 10 will be described in terms of a weatherstrip employed in a motor vehicle; however, it is understood the present invention is not limited to this particular application.

The term "composite strip" 10 includes, but not is not limited to extrusions, moldings, trim, trim pieces, edge pieces, glass guidance components, glass run channels, weatherseals and seals. The present composite strip 10 may be used as a weatherstrip in structural sealing applications including residential and commercial buildings as well as the motor vehicle industry. In the motor vehicle industry, a weatherstrip configuration of the present strip is suitable for use in many areas including, but not limited to, glass guidance components, glass run channels, door seals, roof rails, deck lids, hood to cowl seals, window seals, sun roof seals or window channel seals. In particular, the present invention finds application in glass run channels.

The panel 14 may be any of a variety of materials and does not limit the present invention. For example, the panel 14 may be glass, metal or a composite, which is painted, surface treated or bare. In the operating environment, the panel 14 can be brought repeatedly into and out of engagement with the weatherstrip 10. The engagement of the panel 14 and the weatherstrip 10 may result from motion of the panel relative to the weatherstrip. Alternatively, the weatherstrip 10 may be moved relative to the panel 14.

The weatherstrip 10 of the present invention includes an elastomeric body 40, a bearing layer 60 and a surface coating 90, wherein the surface coating can be formed with or without a multitude of particles.

Elastomeric Body

The elastomeric body 40 forms a base or substrate to which the bearing layer 60 is connected. The elastomeric body 40 can be formed of a variety of materials including thermoplastic or thermosetting materials, including but not limited to TPE, EPDM or any combination thereof. Suitable vulcanized or cross-linked (thermosetting) polymeric materials include the EPDM, EPDM modified with chlorobutyl, nitrile modified EPDM, polyethylene, ethylene vinyl acetate or polypropylene.

The elastomeric body 40 may have a relatively rigid portion and a relative soft portion. That is, the elastomeric body 40 can exhibit dual durometer characteristics. The elastomeric body 40 can include a reinforcing member 42 such as a wire or metal carrier, which may be of known construction (e.g. knitted wire, slotted or stamped metal). It is contemplated, the elastomeric body 40 can also include a thermoplastic portion and a thermoset portion each having a unique rigidity, wherein the thermoplastic portion typically increases the rigidity of the weatherstrip 10. In addition, the elastomeric body 40 may be formed of differing thickness to provide differing amounts of rigidity. The elastomeric body 40 may have any of a variety of cross sections. For example, the cross-section profile may be generally "U" shaped, "J" shaped, "L" shaped or planar. The elastomeric body 40 can include an exterior, or trim portion 80 which does not contact the panel 14.

A satisfactory material for the body 40 has been found to be a thermoplastic elastomer (TPE) or rubber compound based on EPDM. The body 40 has a durometer of approximately 50 to 80 Shore A, with a preferred hardness of approximately 70 Shore A.

Bearing Layer

The bearing layer 60 is connected to the body 40 to be located at the area of contact between the panel 14 and the weatherstrip 10. The bearing layer 60 is connected to the relatively soft portion of the body 40. That is, if the body 40 includes a reinforcing member 42, the bearing layer 60 lies on the relatively soft portion rather than the reinforcing member. The bearing layer 60 can be disposed on the softer elastomeric body 40 to overlay a portion of the body.

Alternatively, the bearing layer 60 can abut the softer elastomeric body 40. That is, the bearing layer 60 can form a portion of the cross sectional profile of composite strip 10. As seen in FIG. 2, the bearing layer 60 does not overlay a portion of the elastomeric body 40, but rather adjoins the body.

The bearing layer 60 has a substantially greater hardness than the elastomeric body 40, excepting certain constructions of the reinforcing member 42. Preferably, the bearing layer 60 has a hardness of approximately 40 to 80 Shore D, wherein a more preferred hardness is approximately 60–65 Shore D. Thus, the bearing layer 60 has a substantially greater hardness than the adjacent portion of the body 40.

The bearing layer 60 generally has a top surface and a bottom surface, wherein the surface coating 90 is disposed on the top surface, and the body 40 is connected to the bottom surface. Thus, the bearing layer 60 can be connected to the body 40 to locate the top surface spaced from, coplanar with or recessed from an adjacent portion of the body 40. Further, portions of the bearing layer 60 may be recessed while a remaining portion is spaced from the adjacent portion of the body 40. However, it is understood the bearing layer 60 can be located such the top and bottom surface are exposed, and an edge portion of the bearing layer is connected to the body 40.

The hardness of the bearing layer 60 is distinct from a rigidity of the bearing layer. Therefore, the bearing layer 60 may have a thickness which is generally flexible, at least sufficiently flexible to preclude the bearing layer 60 from deforming the body along curves or bends if the weatherstrip 10, while maintaining sufficient hardness to provide the reduced friction in cooperation with the surface coating 90.

The bearing layer 60 can be any of a variety of materials that exhibit the desired hardness and are sufficiently compatible with the body 40 to bond to the body, with or without supplemental adhesives. The bearing layer 60 can be in the form of a separate tape or ribbon that is attached to the body 40. Alternatively, the bearing layer 60 can be extruded onto the body 40 before or after the body is cured (if the body is formed of a curable material).

The bearing layer 60 has a thickness at least partially determined by the desired operating parameters of the resulting weatherstrip 10. That is, the thickness of the bearing layer 60 is related to the relative hardness of the material forming the bearing layer, the amount of anticipated force on the weatherstrip 10, as well as the surface coating 90. For a bearing layer 60 having an approximate 65 Shore D hardness, a thickness between approximately 10 microns to 500 microns has been found satisfactory. A hard rubber such as ebonite can also be used. Ultra high molecular weight (UHMW) polyethylene can also be used. In those constructions where the bearing layer 60 is connected along the edges to the body, the layer has a thickness generally equal to the thickness of the adjacent section of the body.

Suitable materials for the bearing layer 60 include, but are not limited to thermoplastics, thermosets, TPEs or UHMW polyethylene having a hardness greater than 50 Shore D. Satisfactory materials include hard rubber (greater than approximately 60 Shore D) or UHMW polyethylene. Preferably, the bearing layer 60 is selected to withstand any processing parameter, including elevated temperatures associated with the relevant formation of the body 40 or the attachment of the surface coating 90 to the bearing layer.

Surface Coating

Figure 5:
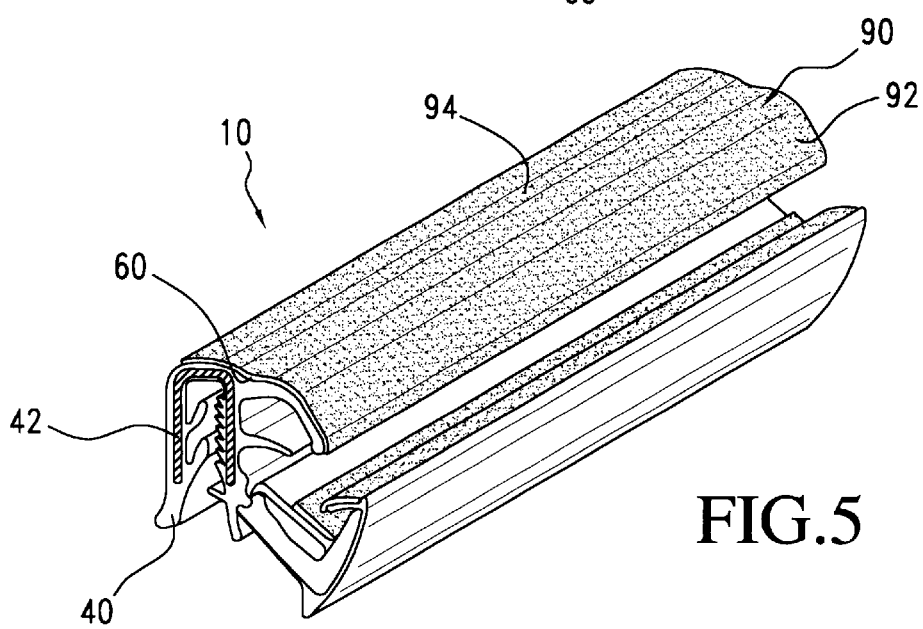
FIG. 5 is a perspective view of an alternative configuration of the weatherstrip.
Figure 6:
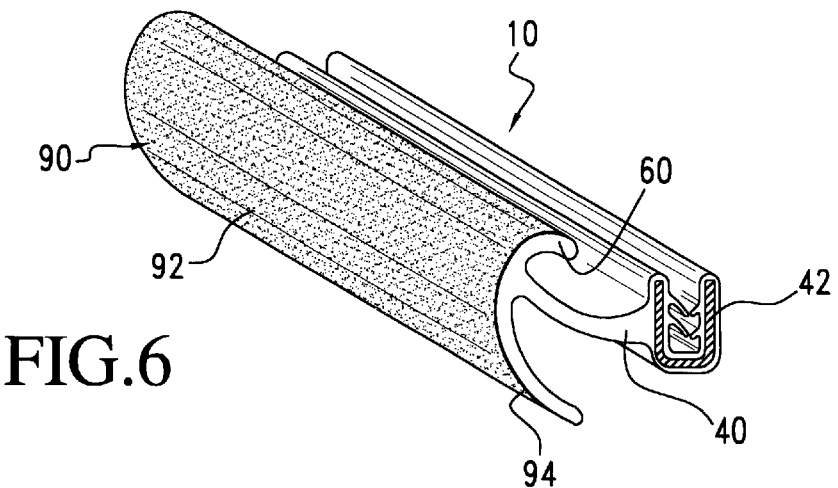
FIG. 6 is a perspective view of another configuration of the weatherstrip.

The surface coating 90 is disposed on the surface of the bearing layer 60. The surface coating 90 forms a contact surface for contacting the panel 14. The surface coating 90 can be selectively formed to include a multitude of particles, thereby forming a particulated coating. The particulated coating 90 includes a carrier resin 92 and a multitude of particles 94. Referring to FIGS. 4–6, the plurality of particles 94 form at least a portion of a contact surface. Alternatively, as seen in FIG. 2, the surface coating 90 can be formed with the carrier resin 92 without including the particles 94.

The particles 94 are selected and sized to provide a sufficient roughness to reduce friction between the weatherstrip 10 and the panel 14 without sacrificing the desired sealing function. That is, the weatherstrip 10 substantially precludes environmental migration, such as water or air leaks, across the panel-weatherstrip interface under intended operating parameters.

The particles 94 may be uniformly distributed throughout the surface coating 90. Alternatively, the particles 94 may be located proximal to the surface of the coating 90. The contact surface is thus defined by a plurality of surface projections extending from the relatively hard bearing layer 60. The surface projections generally define the contact area between the weatherstrip 10 and the panel 14. The surface projections may have a density of approximately 1 to 5 projections per square millimeter. Typically, the surface projections extend from an adjacent portion of the coating by a distance of approximately 5 to 125 microns. It is understood that design considerations may require alternative sized projections, and hence particles 94.

The surface projections may be formed as the particles 94 are encapsulated by the carrier resin 92. That is, a convex bulge in the resin is formed by an underlying particle 94. Alternatively, the projection may be formed by an exposed surface of the particle 94. That is, the particle 94 is partially embedded in the resin 92 and a portion of the particle is exposed as a surface projection. Further, the particle 94 may effectively lie atop of the resin 92, wherein substantially the entire particle defines the projection.

The relative high points defined by the projections provide a reduced surface area in contact with the panel 14. The projections are sufficiently sized and spaced to maintain a seal between the weatherstrip 10 and the panel 14. The reduced area of contact created by the particle results in a reduced static and dynamic coefficient of friction between the weatherstrip and the panel 14. In addition, sliding friction is reduced by present configuration.

The particles 94 and the carrier resin 92 are selected to provide a sufficient bond to preclude separation of the particles from the carrier resin as well as preclude unintended separation from the bearing layer 60 during manufacture, installation and use of the weatherstrip 10.

The particles 94 may be formed of any of a variety of materials including ceramic, mineral, thermoset or thermoplastic materials. Typical materials for the particles 94 include polyethylene, UHMW (ultra high molecular weight) polyethylene, polypropylene, polyamide or cross linked versions thereof. It is also understood the particles 94 may be surface treated to enhance adhesion to the resin 92 and/or the bearing layer 60. Preferably, the particles 94 are non degrading to the panel 14. The plurality of particles 94 may be formed of different materials. That is, a first portion of the plurality of particles 94 may be a first material and a second portion of the plurality of particles may be a second material.

In a first configuration as shown in FIG. 2, the plurality of particles are chemically bonded to the resin 92 and the bearing layer 60. Preferably, the particles 94, the carrier resin 92 and the bearing layer 60 are selected to form a sufficient chemical bond without requiring secondary adhesives. However, it is anticipated that adhesives or bonding agents may be employed to assist in retention of the particles 94. It is also contemplated the particles 94 may be connected to the resin 94 or retained in the coating or to the bearing layer 60 by mechanical connection. That is, the primary retention force results from corresponding structure between the particles 94 and the resin 92 to mechanically retain the particles. Further, the particles 94 may be retained by a combined chemical bonding and mechanical retention.

The particulated configuration of the surface coating 90 may have any of a variety of thicknesses, as dictated by the intended operating environment of the weatherstrip 10. For example, the coating thickness may be from approximately 25 microns to approximately 1,000 microns. The particle size can be selected in conjunction with the desired thickness of the coating.

One configuration of the particulated configuration of the surface coating 90 includes a multitude of thermoplastic particles 94 in a thermoset carrier resin 92, wherein the multitude of particles have a melting temperature greater than a curing temperature of the carrier resin. In this configuration, the particles 94 are ultra high molecular weight (UHMW) olefinic particles and the carrier resin 92 is a cross linkable urethane.

In this configuration, the thermoset carrier resin 92 and associated particles 94 are disposed on the bearing layer 60 and the resin is subsequently cured (crosslinked). A suitable material for the carrier resin 92 is a urethane base having a catalyst, and a silicone to provide enhanced lubricity. The carrier resin 92 can be formed of a thermosetting resin which is curable by any of a variety of mechanisms including chemical, heat, and radiation. Typical materials for the thermosetting resin 92 include, but are not limited to, cross linkable urethane, or a rubber based compound such as EPDM and modified EPDM. A particular material for the carrier resin 92 is a cross linkable urethane solution CHEM-LOK Z320 by Lord Corporation, with a catalyst such as Z320 B. The carrier resin 92 has a curing temperature at which the material becomes cross linked and thermoset. In this configuration, the carrier resin 92 sufficiently bonds to the bearing layer 60 to obviate the need for intermediate adhesives.

The thermoplastic UHMW olefinic particles 94 are embedded in the thermoset carrier resin 92 so as to be bonded to the carrier resin and hence the bearing layer 60. Preferably, the UHMW olefinic particles 94 are chemically bonded to the thermoset material of the carrier resin.

In this construction of the particulated configuration of the surface coating 90, the UHMW olefinic particles 94 may be UHMW polypropylene and the thermoset carrier resin 92 may be a cross linked urethane. The resulting particulated configuration of the surface coating 90 may have a thickness ranging from approximately 25 microns to approximately 1000 microns.

The UHMW olefinic particles 94 may be in a size range of approximately 20 microns to approximately 200 microns, with a selected range of approximately 35 microns to approximately 120 microns, and a preferred range from approximately 35 microns to approximately 65 microns.

The UHMW particles 94 are thermoplastic and thus have a melting temperature. By controlling the molecular weight of the particles 94 and the material of the particles, the melting temperature of the particles can be selected. Typically, molecular weights for the UHMW olefinic material is between approximately 3 million to approximately 6 million. The melting temperature of the UHMW olefinic particles 94 is selected to exceed the curing temperature of the carrier resin 92. UHMW olefinic particles 94 such as INHANCE™ surface modified particles by Fluoro-Seal, Inc. of Houston, Tex. have been found suitable.

In the particulated configuration of the surface coating 90, the particles 94 are at least partially embedded within the thermoset carrier resin 92. A percentage of the thermoplastic particles 94 are entirely encapsulated by the carrier resin 92 and a percentage of the UHMW olefinic particles are at least partially encapsulated by the carrier resin.

It is believed the carrier resin 92 may wear from thermoplastic (UHMW polyethylene) particles 94 at the surface, thus exposing the UHMW olefinic material to the panel 14. The modified UHMW polyethylene particles 94 are sufficiently chemically bonded to the modified urethane of the carrier resin 92, such that separation of the particles from the carrier resin is substantially precluded. As the overlaying carrier resin 92 is removed, abraded, or deteriorates, the UHMW olefinic particles 94 do not separate from the carrier resin and the bearing layer 60. Further, the stresses upon the UHMW olefinic particles 94 during engagement and disengagement with the panel 14 do not induce separation of the UHMW olefinic particles from the carrier resin 92.

In an alternative construction, the carrier resin 92 may be a thermoplastic resin such as an olefin, and may include polypropylene or polyethylene with a low melt flow index. It is understood that fillers, binders or other additives may be included in the carrier resin 92. Preferably, the thermoplastic carrier resin 92 is selected to bond to the material of the bearing layer 60 and the particles 94 without requiring secondary adhesives.

In a further configuration, the multitude of particles 94 may be a thermoset material such as any of a variety of materials that do not exhibit a melting temperature, but rather degrade or disintegrate without melting upon the application of sufficient heat. That is, the particles 94 are not meltable and upon the applications of heat initially retain their solid state. Upon a sufficient amount of heat, the surface particles irreversibly degrade, such that upon cooling do not return to their original composition. Preferably, the particles 94 may be formed of PTFE, molybdenum disulfide, ceramic, or radiation cross linked ultra high molecular weight polyethylene. The particles 94 are selected to have sufficient strength such that upon operable loading, the particles do not fracture or break.

The bearing layer 60, the carrier resin 92 and the plurality of particles 94 are selected such that upon a compressive force against the coating and the projections, the particles are not substantially displaced into the bearing layer 60. That is, the particles 94 maintain the area of contact between the weatherstrip 10 and the panel 14, and the area of contact is not significantly increased upon an increase in the pressure.

The friction reducing surface coating 90 formed without particles 94 can be any of a variety of coatings, including the previously discussed carrier resins 92, such as CHEMLOK Z320 and a catalyst such as Z230 B, both by Lord Corporation. The surface coating 90 is selected to provide a lower coefficient of friction than the underlying bearing layer 60. In a preferred configuration, the surface coating 90 provides a lower coefficient of static friction and a lower coefficient of dynamic friction than the uncoated bearing layer 60. Depending upon the intended operating parameters, the surface coating 90 can be employed with or without the particles 94.

Method of Manufacture

The elastomeric body 40 may be formed by any of a variety of conventional manufacturing methods. Extrusion, molding and forming are all known methods of forming the body 40, with or without a reinforcing member 42.

The bearing layer 60 may be formed in any of a variety of configurations such as a pre-formed tape, co-extruded with the body 40 or a subsequently extruded onto the body.

The particulated configuration of the surface coating 90 may be applied to the bearing layer 60 before or after attachment of the bearing layer to the body 40. That is, the particles 94 may be introduced into the resin 92 after connection of the bearing layer to the body and application of the resin, by any of a variety of deposition methods such as spreaders, sprayers or rollers. Thus, the particulated coating 90 may include particles 94 which are spread, sprayed or rolled onto or into the carrier resin 92. In a preferred construction, the body 40 is formed by extrusion and the bearing layer 60 attached to the body. The part is then surface treated by chemical priming or corona treatment. A typical chemical primer includes CHEMLOK 459 x by Lord Chemical. The particulated coating material (the resin 92 and particle 94 mixture) is then sprayed, sputtered, poured or painted onto the bearing layer 60. The weatherstrip 10 is then baked to adhere the particulated configuration of the surface coating 90 to the bearing layer 60. The surface coating 90 formed without the particles 94, can be applied by similar processes, as dictated by the specific material processing parameters.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A composite vehicular weatherstrip, comprising:
   (a) a bearing layer having a hardness greater than 60 Shore D and a thickness between 10 microns and 500 microns; and
   (b) a friction reducing surface coating on the bearing layer.

2. The composite vehicular weatherstrip of claim 1, wherein the composite strip is a weatherstrip.

3. The composite vehicular weatherstrip of claim 1, wherein the composite strip is a glass run channel.

4. The composite vehicular weatherstrip of claims 1, 2 or 3, wherein the surface coating includes a multitude of particles sized to form surface projections.

5. The composite vehicular weatherstrip of claims 1, 2 or 3, wherein the surface coating includes a multitude of particles sized to form surface projections, and the surface coating is thinner than the bearing layer.

6. The composite vehicular weatherstrip of claims 1, 2 or 3, wherein the bearing layer is a cured rubber.

7. The composite vehicular weatherstrip of claims 1, 2 or 3, further comprising a base connected to the bearing layer, the base having a hardness less than 40 Shore D.

8. The composite vehicular weatherstrip of claims 1, 2 or 3, further comprising a base connected to the bearing layer, wherein the base has a hardness less than 80 Shore A.

9. The composite vehicular weatherstrip of claims 1, 2 or 3, further comprising a base connected to the bearing layer, wherein the bearing layer is located intermediate the base and the surface coating.

10. The composite vehicular weatherstrip of claims 1, 2 or 3, further comprising a base connected to the bearing layer, wherein the base includes a reinforcing member.

11. The composite vehicular weatherstrip of claims 1, 2 or 3, further comprising a base connected to the bearing layer, wherein the base includes a metal reinforcing member.

12. The composite vehicular weather strip of claims 1, 2 or 3, wherein the bearing layer includes one of UHMW polyethylene or a hard rubber.

13. A composite vehicular weatherstrip, comprising:
   (a) a bearing layer having a hardness greater than 40 Shore D; and
   (b) a friction reducing surface coating on the bearing layer, the surface coating including a multitude of particles sized to form surface projections.

14. The composite vehicular weatherstrip of claim 13, wherein the composite strip is a weatherstrip.

15. The composite vehicular weatherstrip of claim 13, wherein the composite strip is a glass run channel.

16. The composite vehicular weatherstrip of claims 13, 14 or 15, wherein the bearing layer has a hardness greater than 60 Shore D.

17. The composite vehicular weatherstrip of claims 13 14 or 15, wherein the bearing layer is a cured rubber.

18. The composite vehicular weatherstrip of claims 13 14 or 15, further comprising a base connected to the bearing layer, the base having a hardness less than 40 Shore D.

19. The composite vehicular weatherstrip of 13, 14 or 15, further comprising a base connected to the bearing layer, wherein the base has a hardness less than 80 Shore A and the bearing layer has a hardness greater than 60 Shore D.

20. The composite vehicular weatherstrip of 13, 14 or 15, further comprising a base connected to the bearing layer, wherein the bearing layer is located intermediate the base and the surface coating.

21. The composite vehicular weatherstrip of claims 13, 14 or 15, further comprising a base connected to the bearing layer, wherein the base includes a reinforcing member.

22. The composite vehicular weatherstrip of claims 13, 14 or 15, further comprising a base connected to the bearing layer, wherein the base includes a metal reinforcing member.

23. The composite vehicular weatherstrip of claims 13, 14 or 15, wherein the bearing layer includes one of UHMW polyethylene or a hard rubber.

24. A vehicular weatherstrip, comprising:

(a) a polymeric body;

(b) a bearing layer integrally connected to the polymeric body, the bearing layer having a hardness greater than (i) 40 Shore D and (ii) the polymeric body; and (c) a friction reducing surface coating on the bearing layer, the surface coating including a multitude of particles sized to form surface projections.

25. The vehicular weatherstrip of claim 24, wherein the composite vehicular weatherstrip is a glass run channel.

26. The vehicular weatherstrip of claim 24, wherein the bearing layer has a hardness greater than 60 Shore D.

27. The vehicular weatherstrip of claim 24, wherein the bearing layer is a cured rubber.

28. The composite vehicular weatherstrip of claim 24, wherein the bearing layer supporting portion has a hardness less than 80 Shore A and the bearing layer has a hardness greater than 60 Shore D.

29. The vehicular weatherstrip of claim 24, wherein the weatherstrip body includes a reinforcing member.

30. The vehicular weatherstrip of claim 29, wherein the reinforcing member is metal.

31. The vehicular weatherstrip of claim 24, wherein the bearing layer includes one of UHMW polyethylene or a hard rubber.

32. The vehicular weatherstrip of claim 24, wherein a thickness of a portion of the vehicular weatherstrip is defined by the bearing layer and the friction reducing surface coating.

33. The vehicular weatherstrip of claim 24, wherein the bearing layer has a thickness substantially equal to an adjacent portion of the polymeric body.

34. The vehicular weatherstrip of claim 24, wherein the bearing layer ad the friction reducing surface coating define two exposed surfaces of the vehicular weatherstrip.

35. A vehicular weatherstrip, comprising:

(a) a polymeric body having a hardness less than 80 Shore A;

(b) a bearing layer integrally connected to a portion of the polymeric body, the bearing layer having a hardness greater than 40 Shore D; and (c) a friction reducing surface coating on the bearing layer.

36. The vehicular weatherstrip of claim 35, wherein the polymeric body has a hardness between 50 Shore A and 80 Shore A.

37. The vehicular weatherstrip of claim 35, wherein the friction reducing surface coating includes a multitude of particles sized to form surface projections.

38. The vehicular weatherstrip of claim 35, wherein a thickness of a portion of the vehicular weatherstrip is defined by the bearing layer and the friction reducing surface coating.

39. The vehicular weatherstrip of claim 35, wherein the bearing layer has a thickness equal to an adjacent portion of the polymeric body.

40. The vehicular weatherstrip of claim 35, wherein the bearing layer and the friction reducing surface coating define two exposed surfaces of the vehicular weatherstrip.

* * * * *

UNITED STATES PATENT AND TRADEMARK OFFICE
CERTIFICATE OF CORRECTION

PATENT NO. : 6,534,147 B2
DATED : March 18, 2003
INVENTOR(S) : Krishnamachari Gopalan It is certified that error appears in the above-identified patent and that said Letters Patent is hereby corrected as shown below:

<u>Title page,</u>
Item [73], Assignee, please delete "Schlegal Corporation" and insert
-- Schlegel Corporation --.

<u>Column 8,</u>
Lines 34-35, paragraph (a) please delete "a bearing layer having a hardness greater than 40 Shore D; and" and insert -- a bearing layer having a hardness greater than 40 Shore D and a thickness between 10 microns and 500 microns; and --.

<u>Column 9,</u>
Line 15, please delete the term "composite".
Line 16, please delete "the bearing layer supporting portion" and insert -- polymeric weatherstrip body --.

Signed and Sealed this

Twenty-ninth Day of July, 2003

JAMES E. ROGAN
*Director of the United States Patent and Trademark Office*